United States Patent
Kuno et al.

(12) 
(10) Patent No.: US 6,421,086 B1
(45) Date of Patent: Jul. 16, 2002

(54) IMAGE PICKUP APPARATUS

(75) Inventors: Tetsuya Kuno; Hiroaki Sugiura; Koichi Yamashita; Narihiro Matoba, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/088,896

(22) Filed: Jun. 2, 1998

(30) Foreign Application Priority Data

Jun. 23, 1997 (JP) ............................................. 9-165825

(51) Int. Cl.$^7$ .............................................. H04N 5/335
(52) U.S. Cl. ........................................ 348/312; 348/296
(58) Field of Search .................................. 348/229, 230, 348/231, 234, 294, 295, 296, 311, 312, 362, 364, 363; H04N 5/235

(56) References Cited

U.S. PATENT DOCUMENTS 5,621,462 A * 4/1997 Takahashi et al. .......... 348/363
6,072,526 A * 6/2000 Hashimoto et al. ......... 348/223
6,191,810 B1 * 2/2001 Oosaka et al. ................ 348/96

FOREIGN PATENT DOCUMENTS

| JP | A-5-56330 | 3/1993 |
| JP | A-5-56332 | 3/1993 |
| JP | A-5-56333 | 3/1993 |
| JP | A-6-78332 | 3/1994 |
| JP | 06-098250 | 4/1994 |
| JP | 06-098251 | 4/1994 |
| JP | A-8-317279 | 11/1996 |

* cited by examiner

Primary Examiner—Tuan Ho

(57) ABSTRACT

A first LUT composed of table values of brightness of N subjects determined in such a manner that the integrated value is made to be constant and a second LUT composed of table values of N charge storage time periods corresponding to the table values of the brightness of the N subjects are provided. When an image has been picked up with charge storage time at an n-th address in the second LUT, integrated value Σ obtained by the calculating means 6 is divided by the n-th charge storage time S so that the brightness L of the subject is calculated. The charge storage time S corresponding to the calculated brightness L of the subject is selected from the first and second LUT so that exposure is controlled.

6 Claims, 13 Drawing Sheets

FIRST LOOKUP TABLE (LUT1)

| ADDRESS | BRIGHTNESS L OF SUBJECT |
|---------|-------------------------|
| 0       | 100                     |
| 1       | $100^{K2}$              |
| 2       | $100^{2K2}$             |
| 3       | $100^{3K2}$             |
| ⋮       | ⋮                       |
| n       | $100^{nK2}$             |
| ⋮       | ⋮                       |
| N − 1   | $100^{(N-1)K2}$         |

SECOND LOOKUP TABLE (LUT2)

| ADDRESS | CHARGE STORAGE TIME S |
|---------|------------------------|
| 0 | $1/60$ |
| 1 | $1/60^{K2}$ |
| 2 | $1/60^{2K2}$ |
| 3 | $1/60^{3K2}$ |
| ⋮ | ⋮ |
| n | $1/60^{nK2}$ |
| ⋮ | ⋮ |
| N − 1 | $1/60^{(N-1)K2}$ |

THIRD LOOKUP TABLE (LUT3)

| ADDRESS | BRIGHTNESS L OF SUBJECT |
|---------|-------------------------|
| 0 | $10$ |
| 1 | $10^{K4}$ |
| 2 | $10^{2K4}$ |
| 3 | $10^{3K4}$ |
| 4 | $10^{4K4}$ |
| 5 | $10^{5K4}$ |
| ⋮ | ⋮ |
| n | $10^{nK4}$ |
| ⋮ | ⋮ |
| N-1 | $10^{(N-1)K4}$ |

FIG. 7

FOURTH LOOKUP TABLE (LUT4)

| ADDRESS | CHARGE STORAGE TIME S |
|---|---|
| 0 | 1/60 |
| 1 | 1/60 |
| 2 | 1/60 |
| 3 | 1/60 |
| 4 | 1/60 |
| 5 | $1/60^{K4}$ |
| ⋮ | ⋮ |
| n | $1/60^{(n-4)K4}$ |
| ⋮ | ⋮ |
| N-1 | $1/60^{(N-5)K4}$ |

FIG. 8

FIFTH LOOKUP TABLE (LUT5)

| ADDRESS | GAIN G OF AGC |
|---|---|
| 0 | $2^{5K4}$ |
| 1 | $2^{4K4}$ |
| 2 | $2^{3K4}$ |
| 3 | $2^{2K4}$ |
| 4 | $2^{K4}$ |
| 5 | 2 |
| ⋮ | ⋮ |
| n | 2 |
| ⋮ | ⋮ |
| N-1 | 2 |

SIXTH LOOKUP TABLE (LUT6)

| ADDRESS | C Log S |
|---|---|
| 0 | C Log (1/60) |
| 1 | C Log (1/60 $n^{K2}$) |
| 2 | C Log (1/60 $n^{2K2}$) |
| 3 | C Log (1/60 $n^{3K2}$) |
| ⋮ | ⋮ |
| n | C Log (1/60 $n^{nK2}$) |
| ⋮ | ⋮ |
| N−1 | C Log (1/60 $n^{(N-1)K2}$) |

SEVENTH LOOKUP TABLE (LUT7)

| Σ | C Log Σ |
|---|---|
| 0 | 0 |
| 1 | 0 |
| 2 | C Log 2 |
| 3 | C Log 3 |
| ⋮ | ⋮ |
| Σ max | C Log Σ max |

EIGHTH LOOKUP TABLE (LUT8)

| ADDRESS n | C Log S |
|---|---|
| 0 | $C \log (1/60)$ |
| 1 | $C \log (1/60)$ |
| 2 | $C \log (1/60)$ |
| 3 | $C \log (1/60)$ |
| 4 | $C \log (1/60)$ |
| 5 | $C \log (1/60^{K4})$ |
| ⋮ | ⋮ |
| n | $C \log (1/60^{(n-4)K4})$ |
| ⋮ | ⋮ |
| N-1 | $C \log (1/60^{(N-5)K4})$ |

NINTH LOOKUP TABLE (LUT9)

| ADDRESS | C Log G |
|---|---|
| 0 | $C \log 2^{5K4}$ |
| 1 | $C \log 2^{4K4}$ |
| 2 | $C \log 2^{3K4}$ |
| 3 | $C \log 2^{2K4}$ |
| 4 | $C \log 2^{K4}$ |
| 5 | $C \log 2$ |
| ⋮ | ⋮ |
| n | $C \log 2$ |
| ⋮ | ⋮ |
| N - 1 | $C \log 2$ |

IMAGE PICKUP APPARATUS

BACKGROUND OF THE INVENTION

The present invention relates to automatic exposure control and automatic gain control which are performed by an image pickup apparatus of an electronic still camera or the like.

More particularly, the present invention relates to an operation of a camera which is performed when a shutter is operated.

FIG. 21 a diagram showing the structure of automatic exposure adjustment for an image pickup apparatus disclosed in Japanese Patent Publication No. Hei 5-37595. Referring to FIG. 21, reference numeral 20 represents a lens, 21 represents an aperture mechanism, 22 represents a drive circuit, 23 represents an image pickup device, 24 represents a preamplifier, represents a variable gain amplifier, 26 represents an A/D converter, 27 represents a synchronization separation circuit, 28 represents a switching circuit, 29 represents a switching control circuit, 30 represents an integrating circuit, 31 represents an abnormality determination circuit, 32 represents an average value calculating circuit, 33 represents a comparison circuit, 34 represents a desired-value memory and 35 represents a reference-value memory.

The operation will now be described. The quantity of light made incident from a subject on the lens 20 is adjusted because the aperture of the lens 20 is adjusted by the aperture mechanism 21. Then, incident light is photoelectrically converted by the image pickup device 23 so as to be transmitted as a picked-up image signal. The A/D converter 26 converts a brightness signal in the picked up image signal into a digital signal which is supplied to a selected integrating circuit 30 by the switching circuit 28.

The synchronization separation circuit 27 separates the picked up image signal into vertical and horizontal synchronizing signals. The following switching control circuit 29 controls the switching operation of the switching circuit 28 in response to clock signals which have been used to control the two synchronizing signals and the image pickup device 23. Thus, switching is performed to correspond to the divided sampling areas, as shown in FIG. 22. That is, a value obtained by A/D-converting the picked up image signal in area A is supplied to an integrating circuit 30A. Similarly, values obtained by A/D-converting the image signals in areas B, D, D, E and F are supplied to integrating circuits 30B, 30C, 30D, 30E and 30F.

Each of the integrating circuits 30A to 30F integrates supplied image signals for one field so as to transmit a result of integration to the abnormality determination circuit 31. Abnormality determination circuits 31A to 31F delete integrated values in areas each including brightness not higher than a constant level determined by the reference-value memory 35 and brightness not lower than a predetermined level to transmit results to the average value calculating circuit 32. The average value calculating circuit 32 calculates average brightness.

The comparison circuit 33 performs comparison with a predetermined brightness level previously stored in the desired-value memory 34. Then, the aperture mechanism 21 and the variable gain amplifier 25 are controlled in such a manner that the average brightness approaches the determined brightness level stored in the desired-value memory 34.

As described above, the conventional image pickup apparatuses have mainly employed TTL metering which requires the comparison circuit for causing the integrated value of an image signal to approach a predetermined level and arranged to adjust exposure in accordance with a result of the comparison performed by the comparison circuit. Although the above-mentioned conventional example comprises the mechanical aperture for adjusting exposure, a similar structure is constituted even if an image pickup device having a variable charge storage time is employed.

In addition to the TTL metering method, an external metering method is known which uses a photometry sensor for measuring the brightness of a picked up image similarly to the metering operation which is performed by the silver salt film, as shown in FIG. 23. Referring to FIG. 23, the same reference numerals as those shown in FIG. 21 represent the same or corresponding elements. Reference numeral 42 represents an A/D converter and 43 represents a microcomputer.

The operation will now be described.

The quantity of incident light converged by the lens 20 is adjusted by the aperture mechanism 21 so that the picked up image is formed on the image pickup device 23. The variable gain amplifier 25 amplifiers a signal transmitted from the image pickup device 23, and then transmits an image signal. A lens 40 for a photometry sensor is disposed in such a manner that an image is formed on the photometry sensor 40 with the same field angle as that of the image formed on the image pickup apparatus 23. The photometry sensor 41 is arranged to transmit a voltage level which is changed in accordance with the quantity of incident light. The transmitted voltage level is converted into a digital signal by the A/D converter 42, and then supplied to the microcomputer 43. The microcomputer 43 is able to detect the quantity of incident light, that is, the brightness of the subject which is being picked up in accordance with the voltage level supplied from the photometry sensor 41. The microcomputer 43 transmits the predetermined degree of aperture of the aperture mechanism 21 and the gain of the variable gain amplifier 25 in such a manner that a predetermined image signal can be obtained in accordance with the value obtained from the photometry sensor 41. Moreover, the microcomputer 43 controls the exposure in such a manner that the level of the image signal which is transmitted from the variable gain amplifier 25 is made to be constant.

The two examples of the exposure control method adapted to the conventional image pickup apparatuses have been described above. Video cameras and electronic still cameras usually employ the TTL metering method shown in FIG. 21 or the external metering method shown in FIG. 23 to control the exposure.

The exposure control which is performed by the conventional image pickup apparatus employing the TTL metering method is arranged in such a manner that the integrated value in each field is subjected to a comparison in the comparison circuit at each operation so as to converge the obtained values in such a manner that a constant brightness level can be realized. To realize a predetermined brightness level, comparison must be performed to correspond to the steps of the degrees of the aperture. Therefore, a long time is required to realize a predetermined image signal level. If the steps of the degree of the aperture is enlarged to shorten the required time, there arises a problem in that the aperture encounters hunting.

The exposure control which is performed by the external metering method is arranged in such a manner that an image similar to that obtainable by the image pickup device is formed on the photometry sensor. Therefore, a precise photometry sensor lens is required. Since the image pickup device has a narrow input dynamic range as compared with that of the silver salt camera, precise exposure control must be performed. Therefore, the accuracy of the aperture mechanism and environmental dependency, such as the temperature characteristic of the photometry sensor, must be considered. As a result, there arises a problem in that the structure becomes too complicated.

What is worse, also the exposure control which is performed by the TTL metering method is required to continuously operate all of the circuits until a required image is picked up. Therefore, there arises a problem in that a battery is consumed extremely quickly if electric power is supplied from the battery.

SUMMARY OF THE INVENTION

An object of the present invention, attempted to solve the above-mentioned problems, is to obtain an image pickup apparatus which is capable of performing precise exposure control with a simple circuit structure and which does not required large power consumption.

An image pickup apparatus according to the present invention has a first LUT composed of table values of brightness of N subjects determined to make the integrated value to be constant and a second LUT composed of table values of N charge storage time periods corresponding to the table values of the brightness of the N subjects. When an image has been picked up with the charge storage time at the n-th address in the second LUT, exposure control is performed in such a manner that the integrated value obtained from the integrating means is divided by the n-th charge storage time so that the brightness of the subject is calculated. Then, charge storage time corresponding to the calculated brightness of the subject is selected from the second LUT.

Moreover, the image pickup apparatus has a third LUT composed of table values of brightness of N subjects determined to make the integrated value to be constant, a fourth LUT composed of table values of N charge storage time periods corresponding to the table values of the brightness of the N subjects and a fifth LUT composed of table values which are gains of N gain adjustment means. When an image has been picked up with the n-th charge storage time and gain in the third and fourth LUT, the integrated value obtained from the integrating means is divided by the n-th charge storage time and gain so that the brightness of the subject is calculated. Moreover, the charge storage time and gain corresponding to the calculated brightness of the subject are selected from the third and fourth LUT so that the exposure control is performed.

Moreover, sixth and seventh LUT having table values which are logarithmic values of table values of the second LUT which are exponentially increased/decreased and which are linearly increased/decreased are provided. The table values which are linearly charged are used to calculate the brightness of the subject.

Moreover, seventh, eighth and ninth LUT having table values which are logarithmic values of table values of the fourth and fifth LUT which are exponentially increased/decreased and which are linearly increased/decreased are provided. The table values which are linearly increased/decreased are used to calculate the brightness of the subject.

The image pickup apparatus has a first power supply circuit for supplying electric power to the solid state image device, the timing generator, the gain adjustment means and the integrating means, a second power supply circuit for supplying electric power to the calculating means and the recording means, and a shutter button having first and second switch mechanisms. When the first switch mechanism has been switched on, electric power is supplied to the image pickup circuit from the first power supply circuit so perform exposure adjustment and gain adjustment operation m times. When the second switch mechanism has been switched on during the m times of the exposure adjustment and the gain adjustment operations, the foregoing operations are performed m times, and an image is picked up by using the charge storage time and gain at the m-th operation. If the second switch mechanism is not switched on during the m times of the exposure adjustment and the gain adjustment operations, the charge storage time and gain at the m-th time are recorded and stored, and supply of electric power from the first power source to the image pickup circuit is interrupted. When the second switch mechanism has been switched on, electric power is again supplied from the first power source to the image pickup circuit. Thus, the image is picked up with the recorded and stored charge storage time and gain at the m-th time.

BRIEF DESCRIPTION OF THE DRAWINGS

FIG. 7 is a diagram showing a fourth LUT.

FIG. 8 is a diagram showing a fifth LUT.

DETAILED DESCRIPTION OF THE PREFERRED EMBODIMENTS

Embodiments of the present invention will now be described with reference to the drawings.

First Embodiment

Figures 1, 2:
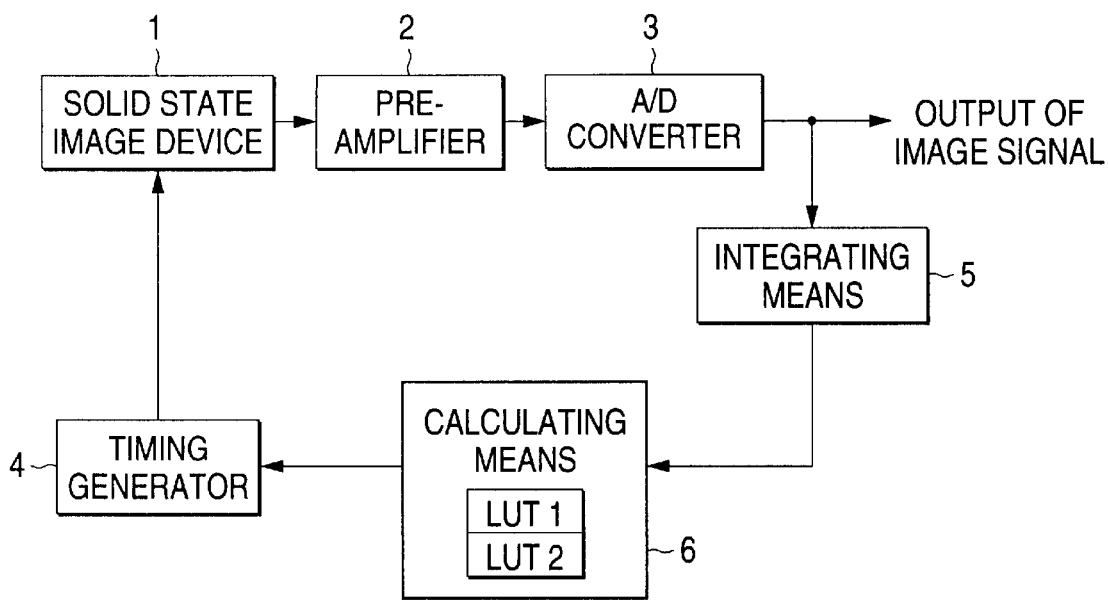
FIG. 1 is a block diagram showing an image pickup apparatus according to a first embodiment of the present invention.
FIG. 2 is a diagram showing a first LUT.

FIG. 1 is a diagram showing an image pickup apparatus according to a first embodiment of the present invention. Referring to the drawings, reference numeral 1 represents a solid state image device 1, 2 represents a pre-amplifier, 3 represents an A/D converter, 4 represents a timing generator, 5 represents an integrating means and 6 represents a calculating means.

The operation will now be described.

A signal transmitted from the solid state image device 1 is amplified by the pre-amplifier 2, and then converted into a digital signal by the A/D converter 3. The timing generator 4 is a circuit for generating drive pulses for the solid state image device 1. When the pulse intervals between the drive pulses are changed, charge storage time S of the solid state image device 1 can be changed. When the charge storage time S is changed, exposure of the solid state image device 1 can be controlled. The integrating means 5 integrates digital image signals for one field supplied from the A/D converter 3, and then transmits an integrated value to the integrating means. The integrating means 5 may integrate all areas in the image signal or a portion (for example, only a portion when central centerweighted metering) of the same. The calculating means 6 receives the integrated value calculated by the integrating means 5 to transmit a control signal to the timing generator 4 to change the intervals of the drive pulses so as to change the charge storage time S of the solid state image device 1 in accordance with the integrated value.

A method of calculations which are performed by the calculating means 6 will now be described above. As shown in FIG. 2, the calculating means 6 has a f first look up table (hereinafter called a "LUT") which indicates brightness L of N subjects which can be expressed by an exponential function in the form of constant K2-th and address value n-th power of a predetermined constant K1. Table values in the LUT. shown in FIG. 1 indicate examples of the brightness L of the subject. When the table value at a 0-th address is 100 [lx](=K1), the table value at a first address is $100^{K2}$ [lx]. Thus, the brightness L of the subject is increased exponentially. When brightness from, for example, 100 [lx] to 100000 [lx] is attempted to be included in the first LUT, K2 is made to be as follows.

$$K2=(100000/100)^{1/(N-1)}$$

Figures 3, 4:
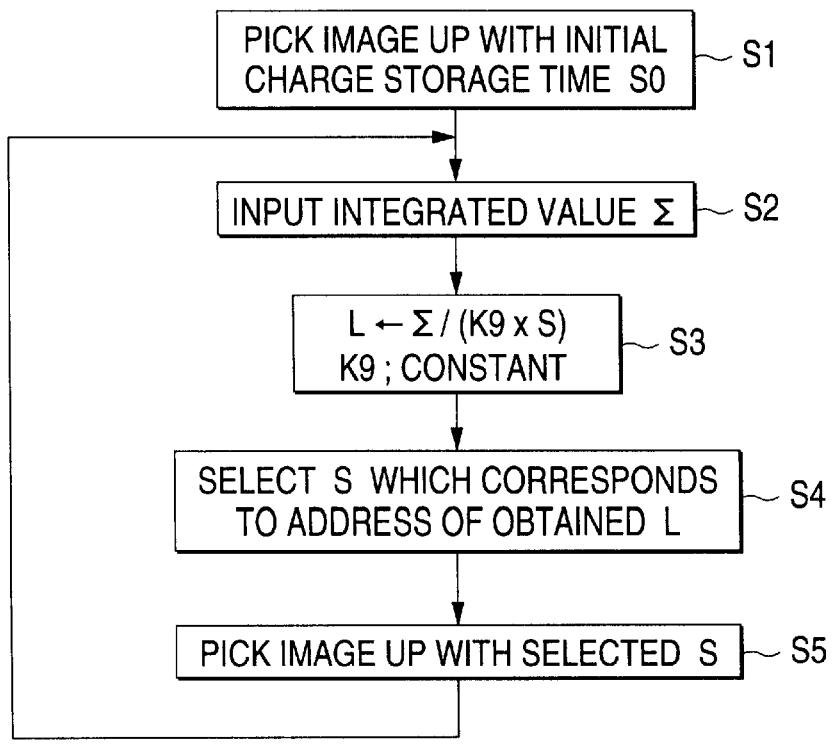
FIG. 3 is a diagram showing a second LUT.
FIG. 4 is a flow chart of the procedure of calculations according to the first embodiment.

The calculating means 6 has a second LUT having tables which are charge storage time S, as shown in FIG. 3. The second LUT has the charge storage time S to make the integrated value obtained by the integrating means 5 to be constant to correspond to the brightness in the first LUT to correspond to the brightness of the subject in the first LUT. Assuming that the brightness of the subject at an n-th address is Ln and charge storage time at the n-th address is Sn, the level of an image signal when an image is picked up with the charge storage time Sn of the solid state image device 1 when the brightness of the subject is Ln is made to be constant. The table values in the second LUT are determined in such a manner that the desired image signal level can be realized. Assuming that the integrated value is Σp, the following equation is satisfied:

$$\Sigma p = K9 \times Ln \times Sn \tag{1}$$

wherein K9 is a constant.

In accordance with Equation (1), brightness Lm' of the subject is obtained from the following equation if the integrated value obtained when an image is picked up with the charge storage time Sm is Σm:

$$Lm' = \Sigma m / (K9 \times Sm) \tag{2}$$

When the image is picked up with the charge storage time Sm' at the same address as that of Lm' in the first LUT calculated as described above, the integrated value Σp, that is, a desired image signal level can be obtained.

A flow chart of the calculating operation which is performed by the calculating means 6 is shown in FIG. 4.

Initially, the calculating means 6 transmits initial value S0 of the charge storage time to the timing generator 4 in step 1 (hereinafter abbreviated to "S1") so that solid state image device 1 picks up a subject with the initial value S0. In S2, integrated value Σ of the image signal obtained when the image has been picked up with the charge storage. time S0. Then, the integrated value Σ obtained in S3 is divided by the charge storage time (initial value of which is S0) for which the image has been picked up and K9 so that brightness L of the subject is calculated.

Then, the calculating means 6 uses the brightness L of the subject calculated in S4 and the first LUT to detect the address value when the brightness is L to use the address value to select the charge storage time S corresponding to the brightness L of the subject from the second LUT. In S5 the calculating means 6 transmits a control signal to the timing generator 4 in such a manner that the solid state image device 1 picks up the image with the charge storage time S selected in S5. Then, the operation returns to S2 so that an integrated value of the image signal picked up with the charge storage time S is supplied. Then, the operations in S2 to S5 are repeated. As a result, the image pickup apparatus is able to perform the exposure adjustment.

Theoretically, the above-mentioned method of controlling the exposure is able to select the appropriate charge storage time S by performing only one calculation operation for obtaining the brightness L of the subject. If the obtained integrated value is extremely small, incomplete result is obtained from the calculation in accordance with Equation (2). Therefore, appropriate charge storage time S for all of brightness of a wide subject cannot easily be obtained without incomplete result of the calculation by only one calculation operation. However, repetition of the above-mentioned operation, that is, the incomplete result of the calculation can indefinitely be reduced as the time approaches the appropriate charge storage time S.

Second Embodiment

Figures 5, 6:
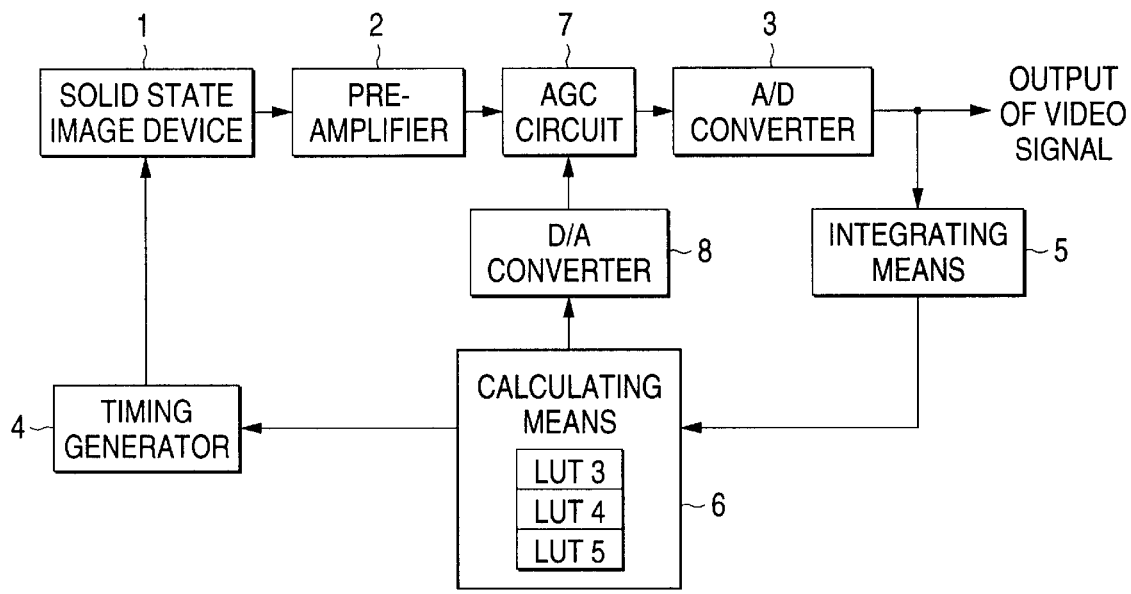
FIG. 5 is a block diagram showing an image pickup apparatus according to a second embodiment of the present invention.
FIG. 6 is a diagram showing a third LUT.

FIG. 5 is a diagram showing an image pickup apparatus according to a second embodiment of the present invention. Referring to FIG. 5, the same reference numerals as those shown in FIG. 1 represent the same and corresponding elements. Reference numeral 7 represents an AGC circuit and 8 represents a D/A converter.

The operation will now be described. A signal transmitted from the solid state image device 1 is amplified by the pre-amplifier 2 and the AGC circuit 7, and then converted into a digital signal by the A/D converter 3. The amplification gain of the AGC circuit 7 is changed in accordance with a voltage level supplied from the D/A converter 8. The timing generator 4 is a circuit for generating drive pulses for the solid state image device 1. When the pulse intervals between the drive pulses are changed, the charge storage time S of the solid state image device 1 can be changed. When the charge storage time S is changed, exposure of the solid state image device 1 can be controlled. The integrating means 5 integrates digital image signals for one field supplied from the A/D converter 3, and then transmits an integrated value to the integrating means 6. The integrating means 5 may integrate all areas in the image signal or a portion (for example, only a portion when central center-weighted metering) of the same. The calculating means 6 transmits a control signal to the timing generator 4 to change the intervals of the drive pulses so as to charge storage time S of the solid state image device 1 in accordance with the supplied integrated value. Moreover, the calculating means 6 transmits, to the D/A converter 8, a control signal for changing the gain of the AGC circuit 7 in accordance with the integrated value. The D/A converter 8 supplies, to the AGC circuit 7, control voltage in the form realized by converting the signal supplied from the calculating means 6 into an analog signal.

A method of calculations which are performed by the calculating means 6 will now be described above. As shown in FIG. 6, the calculating means 6 has a third lookup table showing brightness of N subjects which can be expressed by an exponential function in the form of constant K4-th and address value n-th power of predetermined constant K3 from address 0 to N−1. Table values in the third LUT shown in FIG. 6 indicate examples of the brightness of the subject. When the table value at a 0-th address is 10 [lx](=K3), the table value at a first address is $10^{K4}$ [lx]. Thus, the brightness L of the subject is increased exponentially. When brightness from, for example, 10 [lx] to 100000 [lx] is attempted to be included in the third LUT, K4 is made to be as follows:

$$K4=(100000/10)^{1/(N-1)}$$

The calculating means 6 has a fourth LUT having tables which are charge storage time S as shown in FIG. 7 and a fifth LUT having tables which are gain G of the AGC circuit 7 as shown in FIG. 8. The table values in the fourth and fifth LUT are example. The fourth LUT has a structure that charge storage time S to make the integrated value obtained by the integrating means 5 to be constant to correspond to the brightness in the third LUT to correspond to the brightness of the subject in the third LUT. The fifth LUT has the gain G of the AGC circuit 7 to make the integrated value to be constant. Assuming that the brightness of the subject at an n-th address is Ln, charge storage time at the n-th address is Sn and the gain is Gn, the level of the image signal of the subject having brightness Ln when the image has been picked up with the charge storage time Sn of the solid state image device 1 and the gain Gn of the AGC circuit 7 is made to be constant. To realize a desired image signal level, the charge storage time S and the gain G are determined. Assuming that the integrated value is Σp, the following equation is satisfied:

$$\Sigma p = K10 \times Ln \times Sn \times Gn \qquad (3)$$

wherein K10 is a constant.

In accordance with Equation (3), brightness Lm' of the subject is obtained from the following equation if the integrated value obtained when an image is picked up with the charge storage time Sm and gain Gm is Σm:

$$Lm' = \Sigma m / (K10 \times Sm \times Gm) \qquad (4)$$

When the image is picked up with the charge storage time Sm' and the gain Gm' at the same address as that of Lm' in the first LUT calculated as described above, the integrated value Σp, that is, a desired image signal level can be obtained.

Figure 9:
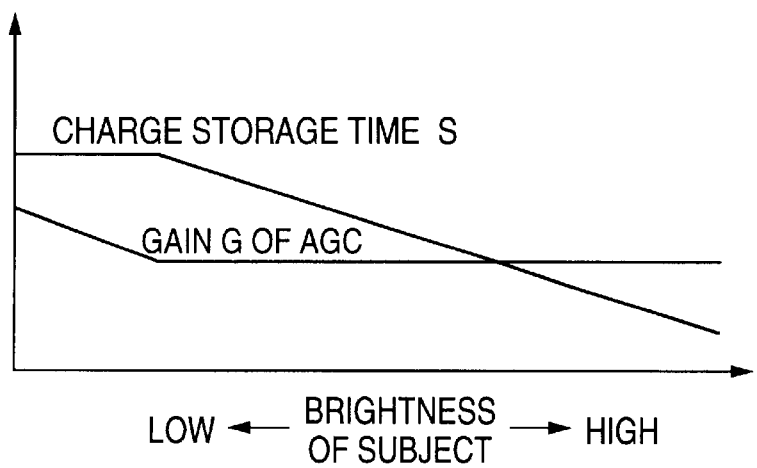
FIG. 9 is a graph showing the relationship among the brightness of a subject, charge storage time and the gain of an AGC circuit according to the second embodiment.

In general, the relationship between the charge storage time S and the gain G of the AGC circuit 7 is determined as shown in FIG. 9 in such a manner that the charge storage time S is elongated as the luminous intensity of the subject is weakened. When the luminous intensity of the subject is lower than appropriate luminous intensity with respect to the longest charge storage time S set to the solid state image device 1, the gain G of the AGC circuit 7 is enlarged. Therefore, the gain G of the AGC circuit 7 is constant in a range of the luminous intensity in which exposure can be adjusted by adjusting the charge storage time S.

Figure 10:
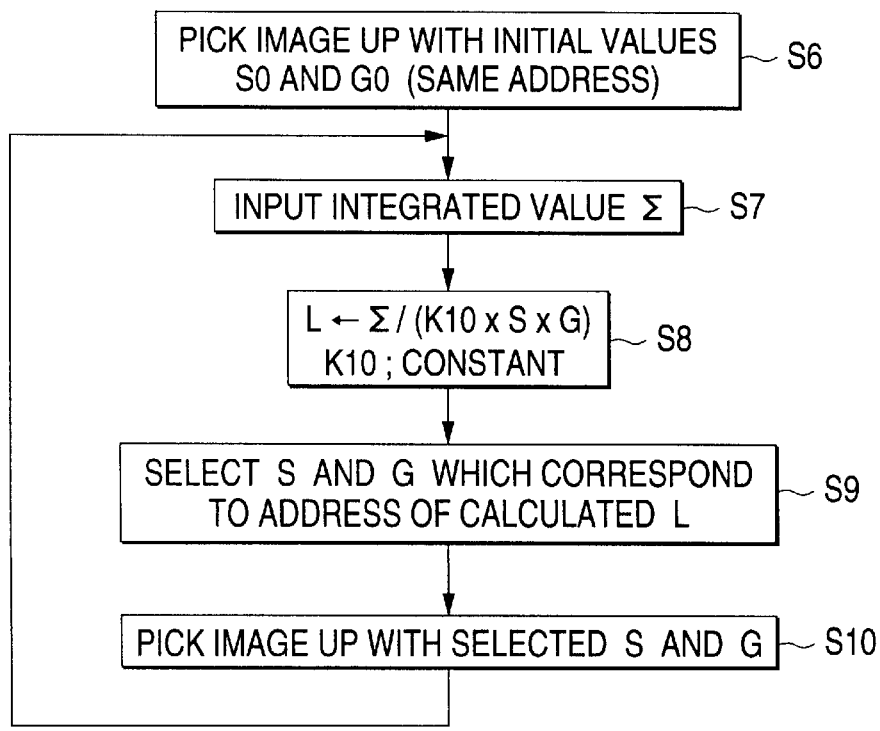
FIG. 10 is a flow chart of a procedure of calculations according to the second embodiment.

A flow chart of the calculating operation which is performed by the calculating means 6 is shown in FIG. 10.

Initially, the calculating means 6 transmits initial value S0 of the charge storage time and gain G0 of the AGC circuit 7 to the timing generator 4 in step 6. Note that the initial value S0 and G0 are table values at the same address. The solid state image device 1 picks up the image of the subject with the initial value S0 and the gain G0 of the AGC circuit 7. In S7 integrated value Σ of the image signal obtained when the image has been picked up with the charge storage time S and the gain G is received. In S8 the obtained integrated value Σ is divided by the charge storage time with which the image has been picked up, the gain (therefore, initial values are S0 and G0) and K10 so that the brightness L of the subject is calculated.

In S9 the calculating means 6 uses the calculated brightness L of the subject and the address in the third LUT corresponding to the brightness L to select charge storage time S corresponding to the brightness L of the subject from the fourth LUT and selects the gain G from the fifth LUT. In S10 the calculating means 6 transmits, to the timing generator 4, a control signal in such a manner that the solid state image device 1 picks up the image with the selected charge storage time S. Moreover, the calculating means 6 transmits a control signal to the D/A converter 8 to make the gain of the AGC circuit 7 to be G. Thus, an image is picked up. Then, the operation returns to S7 so that integrated value Σ of the image signal picked up with the charge storage time S and the gain G is received Then, the operations in S7 to S10 are repeated. Thus, the image pickup apparatus is able to perform the exposure adjustment.

Third Embodiment

An image pickup apparatus according to a third embodiment of the present invention is structured similarly to that shown in FIG. 1 except for the control which is performed by the calculating means 6.

Figures 11, 12:
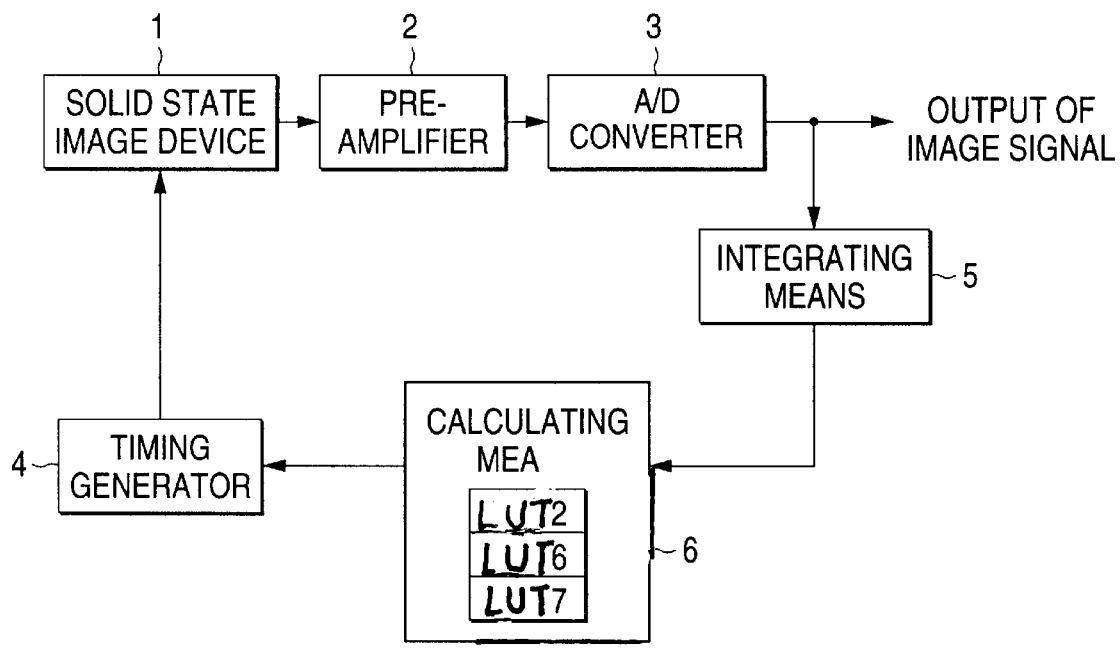
FIG. 11 is a block diagram showing an image pickup apparatus according to a third embodiment of the present invention.
FIG. 12 is a diagram showing a sixth LUT.
Figures 13, 14:
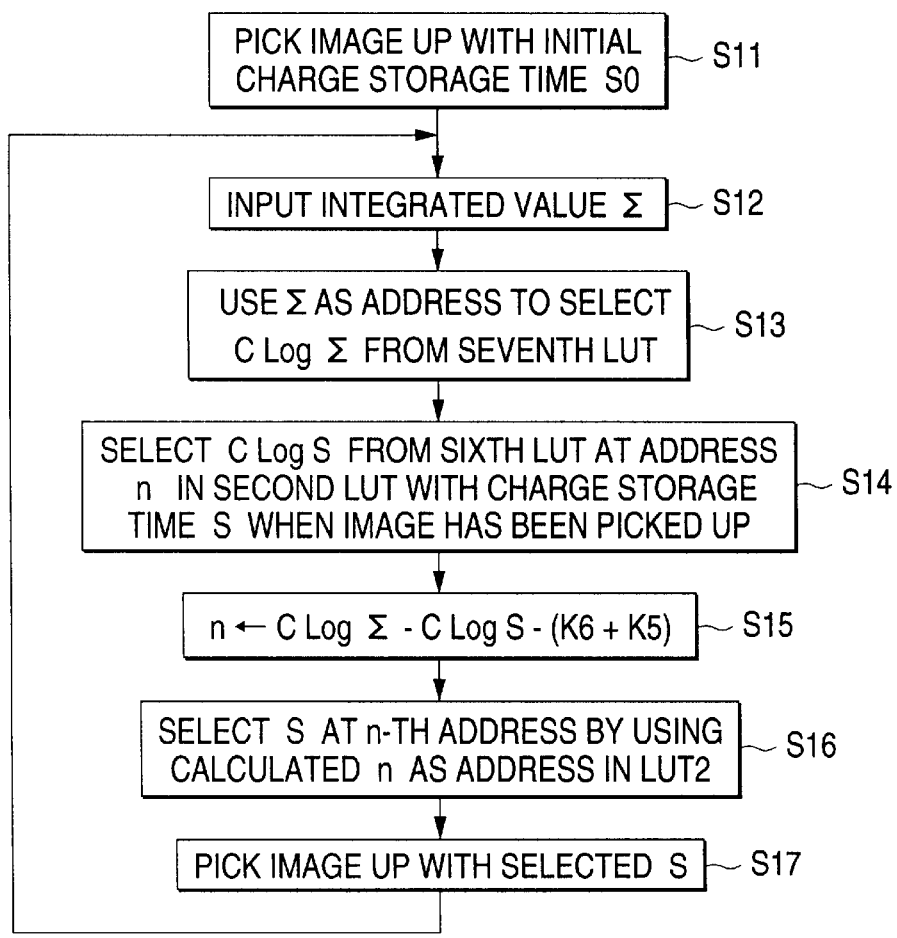
FIG. 13 is a diagram showing a seventh LUT.
FIG. 14 is a flow chart showing the procedure of calculations according to the third embodiment.

The calculating means 6 has the second LUT (see FIG. 3) according to the first embodiment, the sixth LUT shown in FIG. 12 and the seventh LUT shown in FIG. 13.

The method of calculations which are performed by the calculating means 6. The relationship among the integrated value Σ, the brightness L of the subject and the charge storage time S is, as described in the first embodiment, expressed by the following equation:

$$\Sigma = K9 \times L \times S \qquad (5-1)$$

wherein K9 is a constant.

Therefore, the brightness L of the subject can be calculated in accordance with the obtained integrated value Σ and the charge storage time S employed in the picking up operation by using the following equation:

$$L=\Sigma/(K9 \times S) \qquad (5\text{-}2)$$

When the two sides of Equation (5-2) are expressed by logarithms, the following equation is obtained:

$$\log L = \log \Sigma - \log S - \log K9 \qquad (5\text{-}3)$$

Since the first and second LUT are exponentially changed, log L and log S in Equation (5-3) are linear functions. Therefore, when the logarithm log L of each table value is divided by the difference (log Ln+1−log Ln) between the table values at the n-th address and the (n+1)-th address of the logarithm log L of each table value in the first LUT, the difference of a table value which is calculated newly between addresses is one. Assuming that the value at a 0-th address of the first LUT which has been newly calculated is M, the value at the n-th address in the first LUT which has been newly calculated is M +n and the value at the (N−1)-th address is (M+N−1).

Assuming that the inverse of the difference between the table values at the n-th address and the (n+1)-th address of the logarithm log L of each table value in the first LUT is C, the difference of the table value C log L between the addresses is 1 and the same is expressed by a linear function. Thus, subtraction of the constant K5 is performed so that the value at the address and the table value are made to be the same. In the above-mentioned example, K5=M.

When the two sides of Equation (5-3) are calculated as described above, the table indicating the brightness L of the subject is made to be the same value at the address in the other LUT. Therefore, the necessity of using a table indicating the brightness of the subject can be eliminated. Equation (5-3) can be expressed by the following equation:

$$C \log L = C \log \Sigma - C \log S - C \log K9 \qquad (5\text{-}4)$$

Note that C in the above-mentioned equation is 1/(log Ln+1−log Ln). That is, also a value N/(log Lmax−log lmin) which is obtained by dividing the number of tables with the difference between the minimum value and the maximum value in the table. Note that C log K9 is a constant which indicates K6 claimed in claim 3.

Then, K5 is subtracted from the two sides so that the left sides indicate address values from 0 to (N−1).

Address Value (0, 1, 2, . . . , (N−1))=C log L−K5=C log Σ−C log S−(C log K9+K5)=C log Σ−C log S−(K6+K5)    (5-5)

In consideration of Equation (5-5), the calculating means 6 further comprises a sixth LUT having the tables which are C log S shown in FIG. 12 and a seventh LUT having the addresses which are the integrated values Σ shown in FIG. 13 and the tables which are C log Σ.

A flow chart of calculations which are performed by the calculating means 6 is shown in FIG. 14.

In S11 the calculating means 6 transmits initial value S0 of the charge storage time to the timing generator 4. The solid state image device 1 picks up the image of a subject with the initial value S0. In S12 integrated value Σ of the image signal picked up with the charge storage time S0 is received. In S13 the obtained integrated value Σ is used as the address value of the seventh LUT so that C log Σ is selected. Similarly, in S14 the address value in the second LUT of the charge storage time S with which the image has been picked up is used as the address value in the sixth LUT so that C log S is selected. In S15 C log S, K5 and K6 are subtracted from C log Σ as expressed in Equation (5-5) so that the brightness of the subject is calculated.

Since the calculated brightness of the subject is the same as the address value in the second and sixth LUT, the value n indicating the calculated brightness of the subject is as it is used as the addresses in the second and sixth LUT. Thus, the charge storage time S is selected from the second LUT. In S17 a control signal is transmitted to the timing generator 4 in such a manner that the solid state image device 1 picks up the image with the selected charge storage time S. Then, the operation returns to S12 so that the integrated value Σ of the image signal picked up with the charge storage time S is received. Then, the above-mentioned operation is repeated. As a result, the image pickup apparatus is able to perform the exposure adjustment.

As described above, this embodiment is arranged to use Equation (5-5) when the exposure control is performed. Therefore, the necessity of using a LUT having the tables which are the brightness of the subject can be eliminated. Since the calculating means 6 is not required to perform division and multiplication, the calculation process can easily be completed.

Fourth Embodiment

The structure of an image pickup apparatus according to a fourth embodiment of the present invention is similar to that shown in FIG. 5. The difference lies in the control operation which is performed by the calculating means 6.

Figures 15, 16:
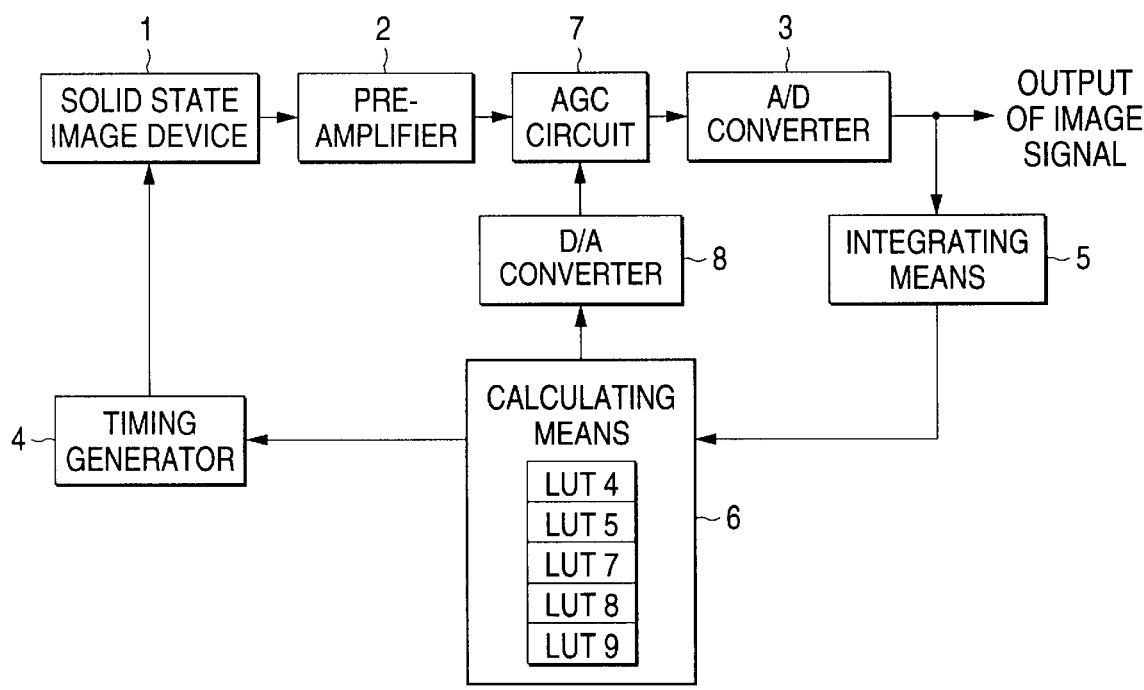
FIG. 15 is a block diagram showing an image pickup apparatus according to a fourth embodiment of the present invention.
FIG. 16 is a diagram showing an eighth LUT.
Figures 17, 18:
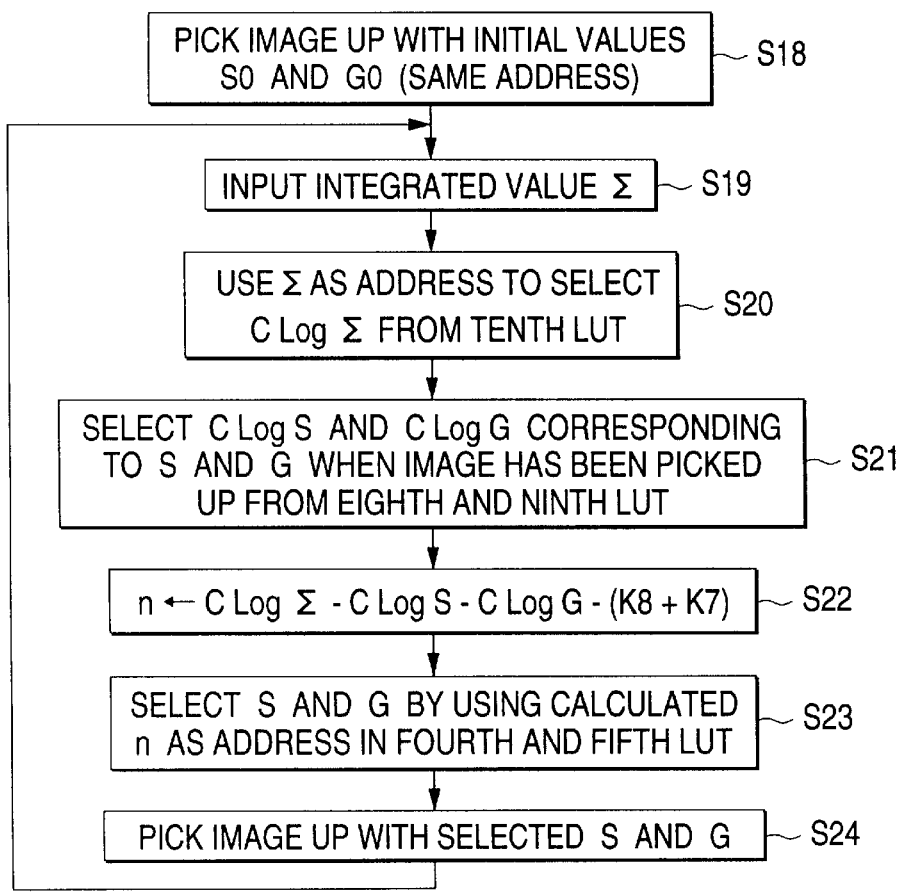
FIG. 17 is a diagram showing a ninth LUT.
FIG. 18 is a flow chart showing the procedure of calculations according to the fourth embodiment.

The calculating means 6 has the fourth LUT (see FIG. 7) according to the second embodiment, the fifth LUT (see FIG. 8), the seventh LUT shown in FIG. 13, the eighth LUT shown in FIG. 16 and the ninth LUT shown in FIG. 17.

The method of calculations which are performed by the calculating means 6 will now be described. The relationship among the integrated value Σ, the brightness L of the subject, the charge storage time S and the gain G of the AGC circuit 7 is expressed by the following equation:

$$\Sigma = K10 \times L \times S \times G \qquad (6\text{-}1)$$

wherein K10 is a constant.

Therefore, the brightness L of the subject can be calculated in accordance with the obtained integrated value Σ, the charge storage time S employed in the picking up operation and the gain G by using the following equation:

$$L=\Sigma/(K10 \times S \times G) \qquad (6\text{-}2)$$

When the two sides of Equation (6-2) are expressed by logarithms, the following equation is obtained:

$$\log L = \log \Sigma - \log S - \text{Log } G - \log K10 \qquad (6\text{-}3)$$

Since the third, fourth and fifth LUT are exponentially changed, log L, log S and log G in Equation (6-3) are linear functions. Therefore, when the logarithm log L of each table value is divided by the difference (log Ln+1−log Ln) between the table values at the n-th address and the (n+1)-th address of the logarithm log L of each table value in the third LUT, the difference of a table value which is calculated newly between addresses is one. Assuming that the value at a 0-th address of the third LUT which has been newly calculated is M, the value at the n-th address is M+n and the value at the (N−1)-th address is (M+N−1).

Assuming that the inverse of the difference between the table values at the n-th address and the (n+1)-th address of the logarithm log L of each table value in the third LUT is C, the difference of the table value C log L between the addresses is 1 and the same is expressed by a linear function. Thus, subtraction of the constant K7 is performed so that the value at the address and the table value are made to be the same. In the above-mentioned example, K7=M.

When the two sides of Equation (6-3) are calculated as described above, the table indicating the brightness L of the subject is made to be the same value at the address in the other LUT. Therefore, the necessity of using a table indicating the brightness of the subject can be eliminated. Equation (6-3) can be expressed by the following equation:

$$C \log L = C \log \Sigma - C \log S - C \log G - C \log K10 \quad (6\text{-}4)$$

Note that C is 1/(log Ln+1−log Ln). Note that C in the above-mentioned equation is 1/(log Ln+1−log Ln). That is, also a value N/(log Lmax−log lmin) which is obtained by dividing the number of tables with the difference between the minimum value and the maximum value in the table. Note that C log K10 is a constant which indicates K8 claimed in claim 4.

Then, K3 is subtracted from the two sides so that the left sides indicate address values from 0 to (N−1).

$$\text{Address Value } (0, 1, 2, \ldots, (N\text{-}1)) = C \log L - K7 = C \log \Sigma - C \log S - C \log G \; (C \log K10 + K7) = C \log \Sigma - C \log S - (K8 + K7) \quad (6\text{-}5)$$

In consideration of Equation (6-5), the calculating means 6 further comprises an eighth LUT having the tables which are C log S shown in FIG. 16 and a seventh LUT having the addresses which are the integrated values Σ shown in FIG. 13 and the tables which are C log Σ.

A flow chart of calculations which are performed by the calculating means 6 is shown in FIG. 18.

In S18 the calculating means 6 transmits initial value S0 of the charge storage time to the timing generator 4 and transmits, to the D/A converter 8, the initial value G0. The initial values S0 and G0 are table values at the same address. The solid state image device 1 picks up the image of a subject with the initial value S0 and the gain G0 of the AGC circuit 7. In S19 integrated value Σ of the image signal picked up with the charge storage time S0 and the gain G0 is received. Then, the calculating means 6 uses the integrated value Σ obtained in S20 as the address value in the LUT shown in FIG. 7 to select C log Σ. In S21 the address value in the fourth LUT of the charge storage time S with which the image has been picked up is used as the address in the eighth LUT so that C log S is selected. The address value of the fifth LUT of the gain G with which the image has been picked up is used as the address value in the ninth LUT so that C log G is selected. In S22 C log S, CLOG G, K7 and K8 are subtracted from C log Σ as expressed in Equation (6-5) so that value n indicating the brightness of the subject is calculated.

Since the value n indicating the calculated brightness of the subject is the address value in the fourth, fifth, eighth and ninth LUT, the value n indicating the calculated brightness of the subject is as it is used as the addresses in the fourth and fifth LUT. In S23 the charge storage time S is selected from the fourth LUT, and the gain G is selected from the fifth LUT. Then, the calculating means 6 transmits, to the timing generator 4, a control signal in such a manner that the solid state image device 1 picks up the image with the charge storage time S selected in S24. Moreover, the calculating means 6 transmits, to the D/A converter 8, a control signal in such a manner that the gain of the AGC circuit 7 is made to be G. Then, the operation returns to S19 so that the integrated value Σ of the image signal picked up with the charge storage time S is received. Then, the operations in S19 to S24 are repeated. As a result, the image pickup apparatus is able to perform the exposure adjustment.

As described above, this embodiment has the structure to perform the exposure control by using Equation (6-5). Therefore, the necessity of using a LUT having the tables which are the brightness of the subject can be eliminated. Since the calculating means 6 is not required to perform division and multiplication, the calculation process can easily be completed.

Fifth Embodiment

Figure 19:
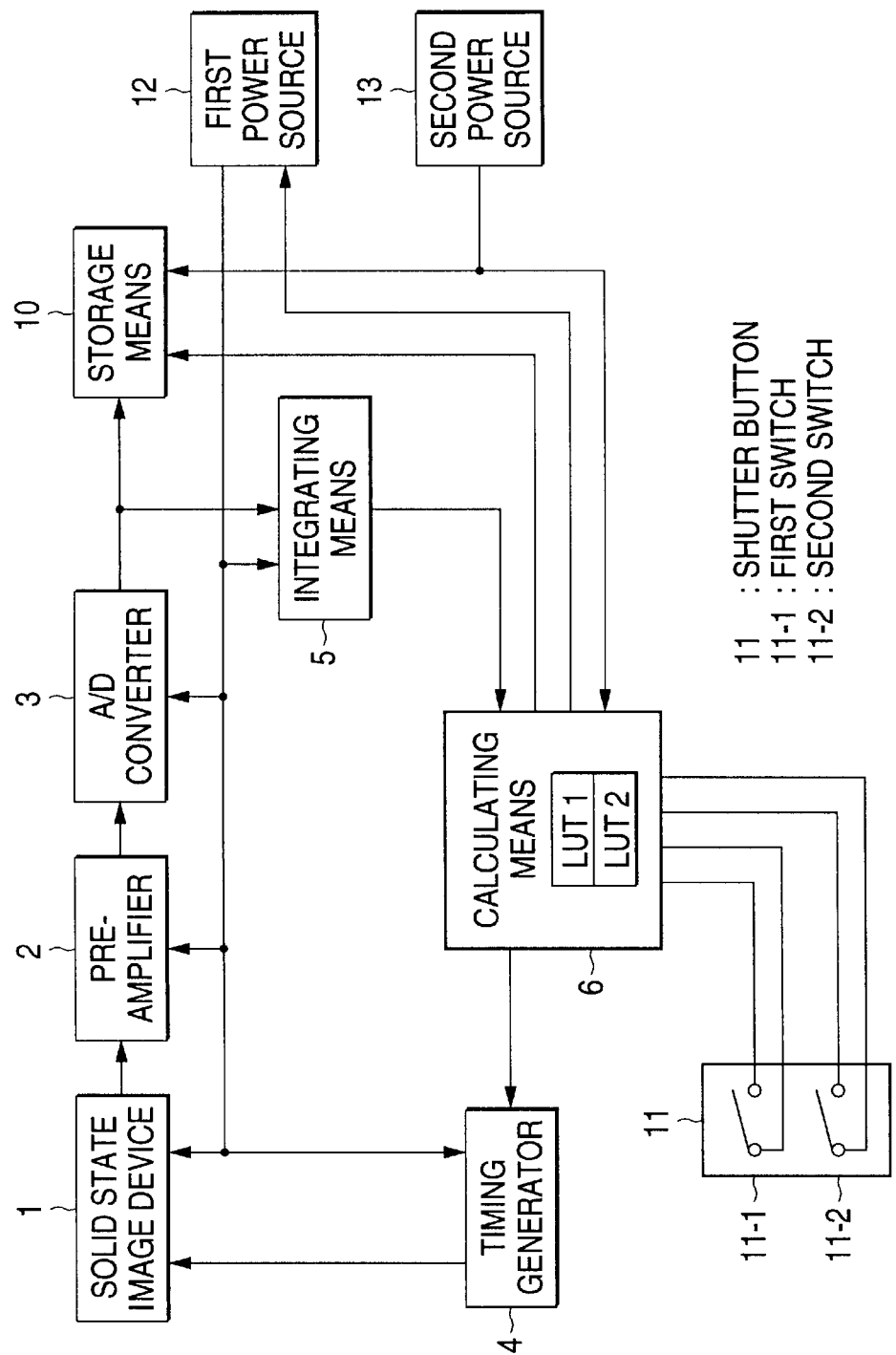
FIG. 19 is a block diagram showing an image pickup apparatus according to a fifth embodiment of the present invention.

FIG. 19 is a diagram showing an image pickup apparatus according to a fifth embodiment of the present invention. The same reference numerals as those shown in FIG. 1 are the same or corresponding elements.

Referring to FIG. 19, reference numeral 10 represents a recording means for recording a picked up image signal on a recording medium. Reference numeral 11 represents a shutter button which is depressed from outside the apparatus by a user who requires to pick up an image or to pick up an image and record an image signal. Reference numeral 11-1 represents a first switch, 11-2 represents a second switch, 12 represents a first power supply circuit for supplying electric power to each circuit of image pickup system including the solid state image device 1, the pre-amplifier 2, the A/D converter 3, the timing generator 4 and the integrating means 5. Reference numeral 13 represents a second power supply circuit for supplying electric power to the calculating means 6 and a recording means 10.

Figure 20:
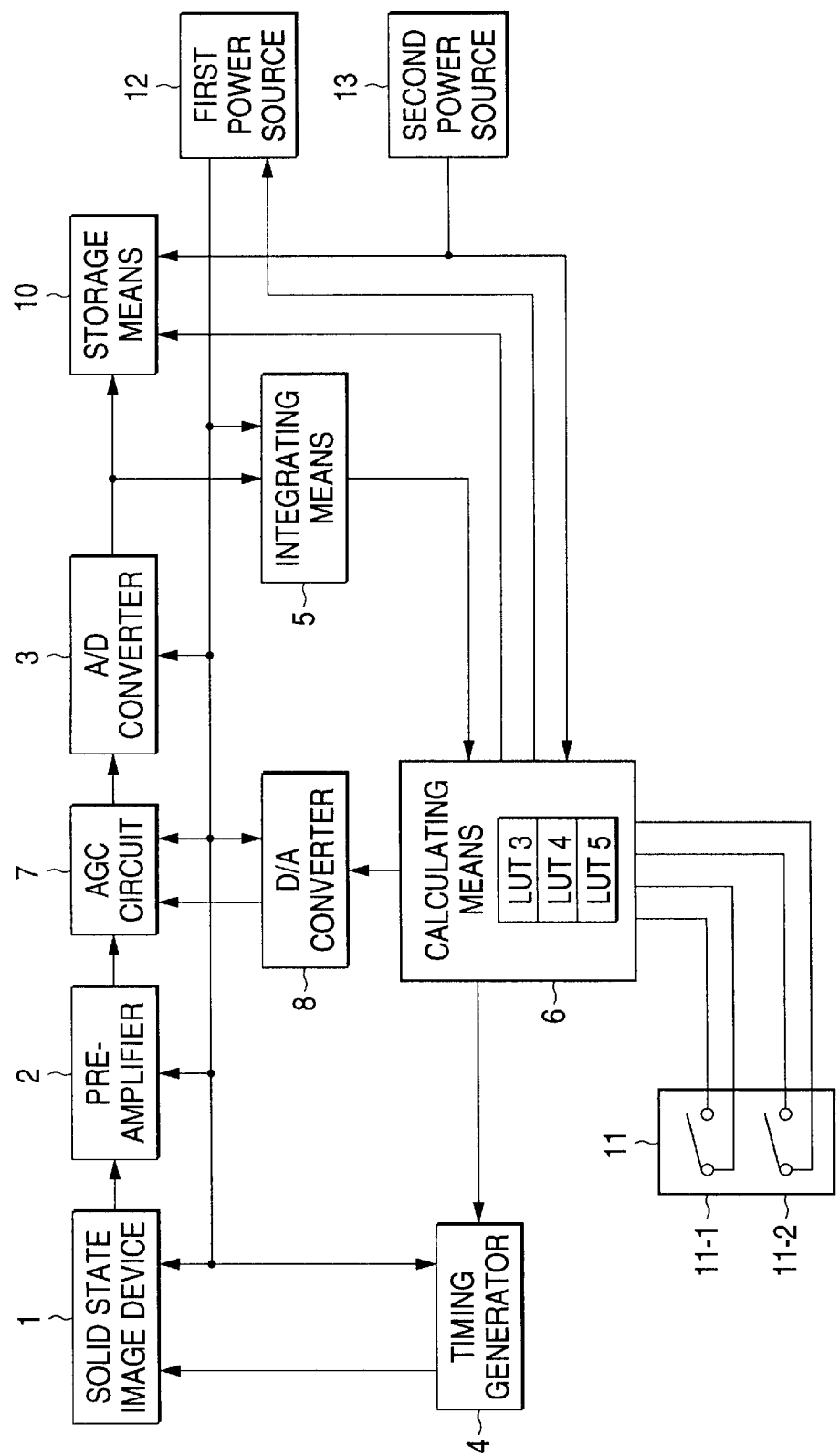
FIG. 20 is a block diagram showing an image pickup apparatus according to a sixth embodiment of the present invention.
Figure 21:
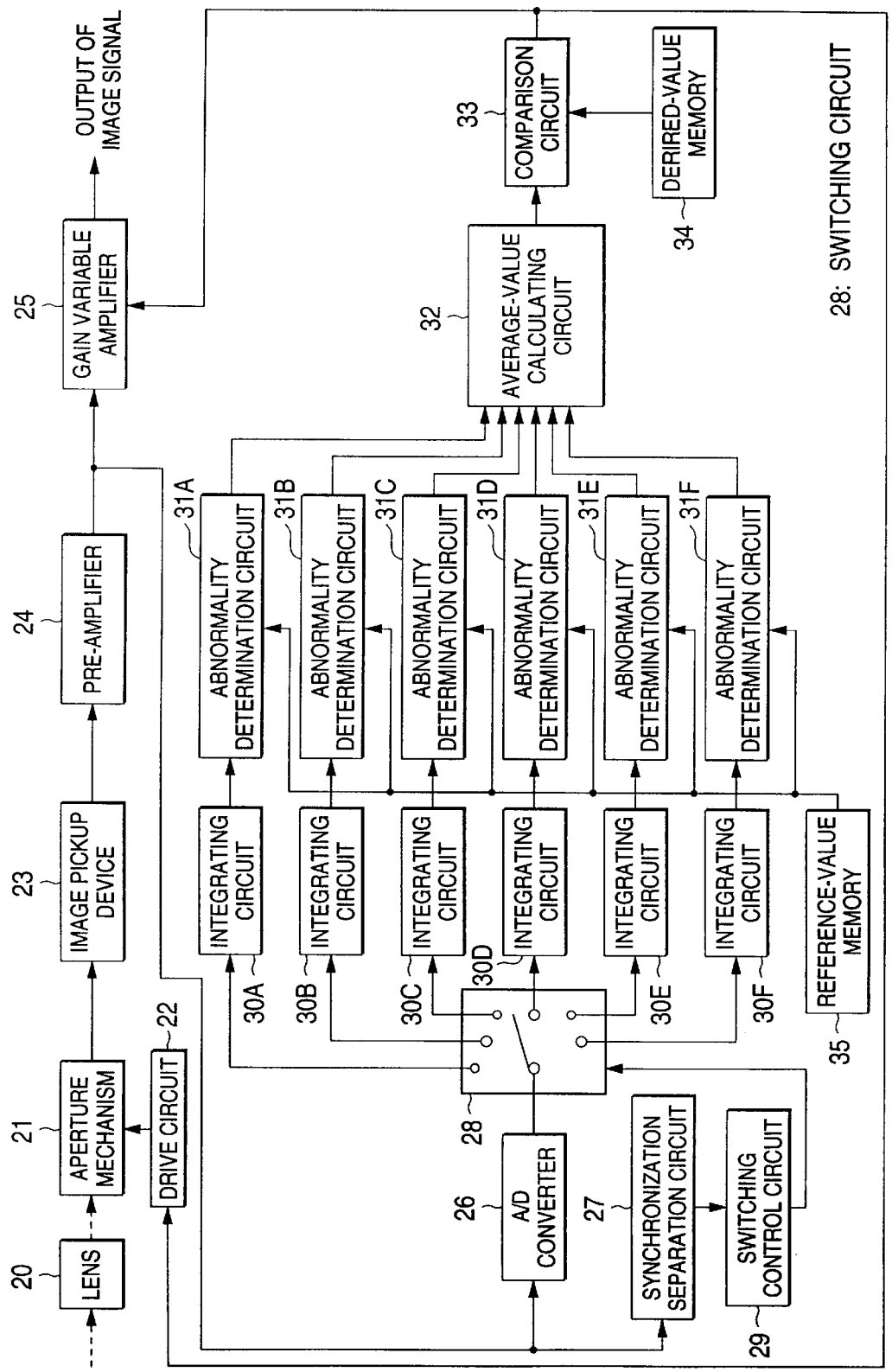
FIG. 21 is a block diagram showing a conventional image pickup apparatus.
Figure 22:
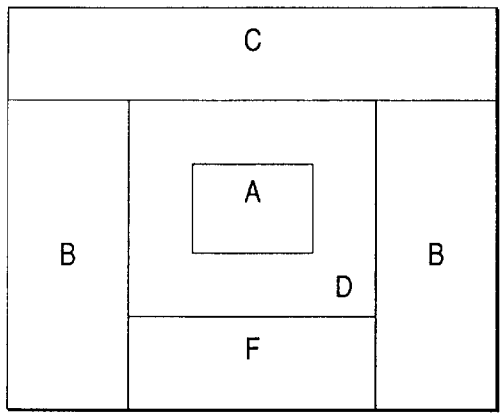
FIG. 22 is a diagram showing a metering area of the conventional image pickup apparatus.
Figure 23:
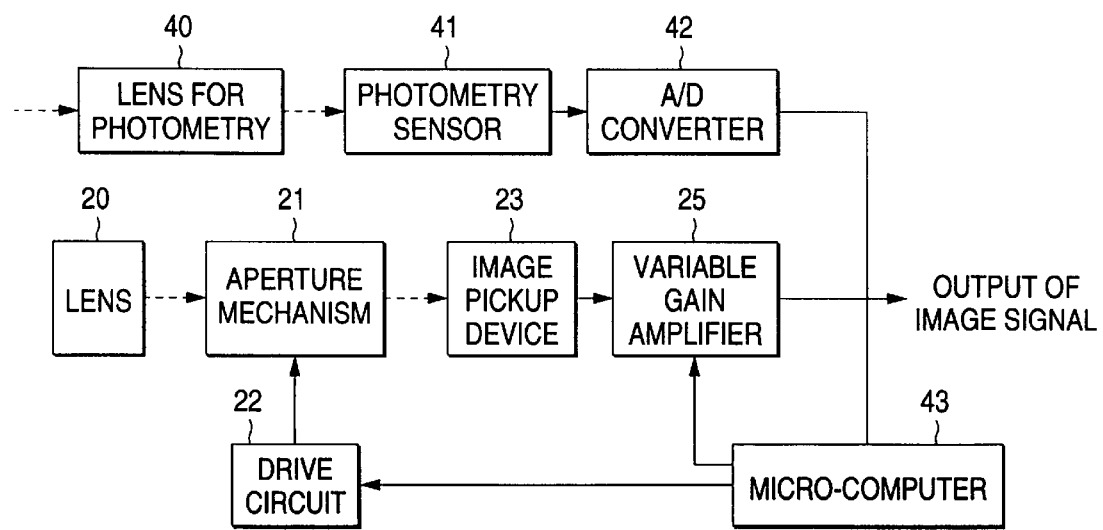
FIG. 23 is a block diagram showing another conventional image pickup apparatus.

The above-mentioned structure shown in FIG. 20 is formed by adding the recording means 10, the shutter button 11, the first power supply circuit 12 and the second power supply circuit 13 to the circuit according to the second embodiment or the fourth embodiment and shown in FIG. 5.

The operation which is different from the first embodiment will now be described.

The second power supply circuit 13 always supplies electric power to the calculating means 6 and the recording means 10 when the image pickup apparatus is operated. The first power supply circuit 12 supplies electric power to each circuit in the image pickup system, that is, the solid state image device 1, the pre-amplifier 2, the A/D converter 3, the timing generator 4 and the integrating means 5. Moreover, supply and interruption of electric power are controlled by the calculating means 6. The shutter button 11 comprises the first switch 11-1 and the second switch 11-2. When the shutter button 11 is depressed, the first switch 11-1 is switched on, and then the second switch 11-2 is switched on. That is, a two-step depression switch is constituted. The ON/OFF signals of the first and second switches are supplied to the calculating means 6.

When the first switch 11-1 of the shutter button 11 has been switched on, the calculating means 6 transmits, to the first power supply circuit 12, a control signal so that electric power is supplied to each circuit. In response to the control signal supplied from the calculating means 6, the first power supply circuit 12 supplies electric power to each circuit in the image pickup system. After electric power has been supplied to each circuit in the image pickup system, the calculating means 6 performs the exposure control m times by the method according to any one of the first to fourth embodiment. When the ON signal of the second switch 11-2 has been supplied during the m times of the exposure control operations, the calculating means 6 transmits a control signal to the recording means 10 in such a manner that the image signal obtained by picking up the image with the charge storage time Sm and the gain Gm at the moment at which the exposure control has been performed m times is recorded on the recording medium. Thus, the recording means 10 records the image signal on the recording medium.

If the ON signal of the second switch 11-2 is not supplied during the m times of the exposure control operations, the calculating means 6 records and stores the charge storage time Sm and the gain Gm at the moment when the exposure control operations have been performed m times. Moreover, the calculating means 6 transmits a control signal to the first power supply circuit 12 so that supply of electric power is interrupted. In response to the control signal supplied from the calculating means 6, the first power supply circuit 12 interrupts supply of electric power to each circuit in the image pickup system. If ON signal of the second switch 11-2 is then supplied to the calculating means 6, the calculating means 6 transmits, to the first power supply circuit 12, a control signal to supply electric power to each circuit. After electric power has been supplied to each circuit, the calculating means 6 transmits, to the recording means 10, a control signal so that an image is picked up with the recorded and stored charge storage time Sm and gain Gm. Moreover, an image signal of the image picked up with the charge storage time Sm and the gain Gm is recorded on the recording medium. The recording means 10 records the image signal on the recording medium.

As a result of the thus arranged structure, a function of fixing exposure by the TTL metering method can be realized. Since electric power is supplied to the image pickup circuit only when an image is picked up, power consumption can be reduced. Since supply of electric power to the image pickup system is interrupted after image pick up has been performed m times even if only the first switch 11-1 is continuously be depressed, power consumption can be reduced.

Sixth Embodiment

FIG. 20 is a diagram showing an image pickup apparatus according to a sixth embodiment of the present invention. The same reference numerals as those shown in FIGS. 5 and 19 represent the same or corresponding elements. The first power supply circuit 12 supplies electric power to also the AGC circuit 7 and the D/A converter 8.

The operation of the calculating means 6 according to the sixth embodiment is similar to that according to the second embodiment. The operations of the recording means 10, the shutter button 11, the first power supply circuit 12 and the second power supply circuit 13 are similar to those according to the fifth embodiment. Similarly to the fifth embodiment, fixed exposure by the TTL metering method can be realized over a wide luminous intensity of a subject. Moreover, power consumption can be reduced.

Since the present invention has the above-mentioned structure, the following effects can be obtained.

An image pickup apparatus can be obtained which is capable of performing accurate exposure adjustment by only repeating plural operations when the exposure is controlled by the TTL metering method.

An image pickup apparatus can be obtained which is capable of performing accurate exposure adjustment by only repeating plural operations in a wider luminous intensity range of a subject by the exposure control by the TTL metering method.

An image pickup apparatus can be obtained which is capable of performing accurate exposure adjustment without a necessity of performing calculations, such as multiplication and division, when the exposure is controlled by the TTL metering method.

An image pickup apparatus can be obtained, which is capable of performing accurate exposure adjustment in a wide luminous intensity range of a subject without a necessity of performing calculations, such as multiplication and division when the exposure is controlled by the TTL metering method.

An image pickup apparatus can be obtained which is capable of realizing fixed exposure function and reducing power consumption.

What is claimed is:

1. An image pickup apparatus comprising:
   a solid state image device having changeable. time for which charges are stored therein;
   a timing generator for generating drive pulses for driving said solid state image device and changing pulse intervals between the drive pulses so as to adjust the storage time of said solid state image device;
   integrating means for calculating an integrated value of one frame or a portion of an image signal obtained from said solid state image device; and
   calculating means for determining the pulse intervals between the drive pulses generated by said timing generator in accordance with the integrated value obtained from said integrating means so as to control the charge storage time of said solid state image device, wherein
   said calculating means includes:
      a first LUT composed of table values of brightness of N subjects at addresses 0 to (N−1) which can be expressed by an exponential function in the form of constant K2-th and address value n-th power of predetermined constant K1; and
      a second LUT composed of table values of N charge storage time periods determined in such a manner that a predetermined image signal level can be obtained to correspond to the table values of the brightness of N subjects, and wherein
         exposure of an electronic still camera is performed by repeating operations that when an image has been picked up with the charge storage time at the n-th address in said second LUT, the integrated value obtained from said integrating means is divided by the n-th charge storage time so that the brightness of the subject is calculated, charge storage time corresponding to the calculated brightness of the subject is selected from said second LUT, and a next image is picked up with the selected charge storage time.

2. An image pickup apparatus comprising:
   a solid state image device having changeable time for which charges are stored therein;
   a timing generator for generating drive pulses for driving said solid state image device and changing pulse intervals between the drive pulses so as to adjust the storage time of said solid state image device;
   integrating means for calculating an integrated value of one frame or a portion of an image signal obtained from said solid state image device; and
   calculating means for determining the pulse intervals between the drive pulses generated by said timing generator in accordance with the integrated value obtained from said integrating means so as to control the charge storage time of said solid state image device, wherein said calculating means includes;
- a third LUT composed of table values of brightness of N subjects at addresses 0 to (N−1) which can be expressed by an exponential function in the form of constant K4 and address value n-th power of predetermined constant K3;
- a fourth LUT composed of table values of N charge storage time periods determined in such a manner that a predetermined image signal level can be obtained to correspond to the table values of the brightness of N subjects; and
- a fifth LUT composed of table values of gains of N gain adjustment means, and wherein
   - control of exposure of said image pickup apparatus and control of the gain of the image signal are performed by repeating operations that when an image has been picked up with the n-th charge storage time and gain in said fourth and fifth LUT, the integrated value obtained from said integrating means is divided by the n-th charge storage time and gain so that the brightness of the subject is calculated, charge storage time and gain corresponding to the calculated brightness of the subject-are selected from said third, fourth and fifth-LUT, and a next image is picked up with the selected charge storage time and gain.

3. The image pickup apparatus of claim 1, wherein said calculating means previously determines:
   constant K5 which is subtracted from values obtained by multiplying logarithmic values of table values in said first LUT with inverse C of the difference between a logarithmic value of an n-th table value in said first LUT and a logarithmic value of an (n+1)-th table value so that N table values from a 0-th table value to an (N−1)-th table value are made to be the same as addresses 0 to (N−1) in the LUT which are increased by one; and
   value K6 obtained by multiplying a logarithmic value of a constant which is determined by dividing the integrated value with the brightness of the subject and the charge storage time with the inverse C, and comprises:
   said second LUT;
   a sixth LUT composed of values C log S obtained by multiplying the logarithmic values of table values S in said second LUT with the inverse C; and
   a seventh LUT having addresses which are the integrated values calculated by said calculating means and tables which are the values C log Σ obtained by multiplying the logarithmic values of the integrated values Σ with the inverse C, wherein
      when an image has been picked up with an n-th charge storage time Sn in said second LUT, an integrated value obtained from said integrating means is used as the address in said seventh LUT to select C log Σ from said seventh LUT, and
      an n-th C log Sn in said sixth LUT is subtracted from C log Σ, then the constant K5 and the constant K6 are subtracted so that the brightness of the subject is calculated, and the brightness of the calculated subject is as it is used as the address value of said second LUT so that charge storage time for a next image pickup operation is determined.

4. The image pickup apparatus of claim 2, wherein said calculating means previously determines:
   constant K7 which is subtracted from values obtained by multiplying logarithmic values of table values in said third LUT with inverse C of the difference between a logarithmic value of an n-th table value in said third LUT and a logarithmic value of an (n+1)-th table value so that N table values from a 0-th table value to an (N−1)-th table value are made to be the same as addresses 0 to (N−1) in the LUT which are increased by one, and
   value K8 obtained by multiplying a logarithmic value of a constant which is determined by dividing the integrated value with the brightness of the subject and the charge storage time with the inverse C, and comprises:
   a fourth LUT having the tables which are the charge storage time,
   an eighth LUT having the tables which are values C log S obtained by multiplying logarithmic values of table values S of said fourth LUT with the inverse C,
   a fifth LUT having tables which are gains of said gain adjustment means,
   a ninth LUT having tables which are values C log G obtained by multiplying logarithmic values of table values G of said fifth LUT with the inverse C, and
   a seventh LUT having addresses which are integrated values calculated by said integrating means and tables which are values C log Σ obtained by multiplying logarithmic values of the integrated values Σ with the inverse C, and wherein
      when an image has been picked up with an n-th charge storage time Sn and gain Gn in said fourth and fifth LUT, C log Σ is selected by using the integrated value obtained from said integrating means as the address in said seventh LUT,
      n-th C log Sn in said eighth LUT and n-th C log Gn in said ninth LUT are subtracted from C log Σ, and then the constants K7 and K8 are subtracted so that the brightness of the subject is calculated, and the calculated brightness of the subject is as it is used as address values in said fourth and fifth LUT so that the charge storage time and the gain of an image signal are determined.

5. The image pickup apparatus of claim 1, further comprising:
   recording means for recording a picked up image on a recording medium,
   a first power supply circuit for supplying electric power to said solid state image device, said timing generator, said gain adjustment means and said integrating means,
   a second power supply circuit for supplying electric power to said calculating means and said recording means, and
   a shutter button having first and second switch mechanisms arranged in such a manner that said first switch mechanism is switched on when a shutter is depressed and also said second switch mechanism is switched on when said shutter is furthermore depressed, wherein
   said calculating means transmits a control signal in such a manner that when an activation signal is supplied from said first switch mechanism in a state where electric power has been supplied from said second power supply circuit to said calculating means and said recording means, electric power is supplied from said first power source so that the exposure adjustment and a gain adjustment operation are performed m times, when an activation signal is supplied from said second switch mechanism during the m times of the exposure adjustment and the gain adjustment operation, the operations are performed m times, and then an image picked up with the charge storage time and gain at the m-th time are recorded on the recording medium, and when the activation signal is not supplied from said second switch mechanism during the m times of the exposure adjustment and gain adjustment operations, said recording means is controlled in such a manner that the charge storage time and gain at the m-th time are recorded and stored, and then supply of electric power from said first power source is interrupted, when the activation signal is then supplied from said second switch mechanism, electric power is again supplied from said first power source to said image pickup circuit so that an image is picked up with the recorded and stored charge storage time and gain at the m-th time, and then the picked up image is recorded on the recording medium.

6. The image pickup apparatus of claim 2, further comprising:

recording means for recording a picked up image on a recording medium, a first power supply circuit for supplying electric power to said solid state image device, said timing generator, said gain adjustment means and said integrating means, a second power supply circuit for supplying electric power to said calculating means and said recording means, and a shutter button having first and second switch mechanisms arranged in such a manner that said first switch mechanism is switched on when a shutter is depressed and also said second switch mechanism is switched on when said shutter is furthermore depressed, wherein said calculating means transmits a control signal in such a manner that when an activation signal is supplied from said first switch mechanism in a state where electric power has been supplied from said second power supply circuit to said calculating means and said recording means, electric power is supplied from said first power source so that the exposure adjustment and a gain adjustment operation are performed m times, when an activation signal is supplied from said second switch mechanism during the m times of the exposure adjustment and the gain adjustment operation, the operations are performed m times, and then an image picked up with the charge storage time and gain at the m-th time are recorded on the recording medium, and when the activation signal is not supplied from said second switch mechanism during the m times of the exposure adjustment and gain adjustment operations, said recording means is controlled in such a manner that the charge storage time and gain at the m-th time are recorded and stored, and then supply of electric power from said first power source is interrupted, when the activation signal is then supplied from said second switch mechanism, electric power is again supplied from said first power source to said image pickup circuit so that an image is picked up with the recorded and stored charge storage time and gain at the m-th time, and then the picked up image is recorded on the recording medium.

* * * * *